United States Patent [19]

Kapoor

[11] Patent Number: 5,805,459
[45] Date of Patent: Sep. 8, 1998

[54] METHOD OF MEASURING ACTIVITY IN A DIGITAL CIRCUIT

[75] Inventor: Bhanu Kapoor, Dallas, Tex.

[73] Assignee: Texas Instruments Incorporated, Dallas, Tex.

[21] Appl. No.: 427,339

[22] Filed: Apr. 24, 1995

[51] Int. Cl.$^6$ .............................. G06F 15/00; G06F 1/26
[52] U.S. Cl. ......................... 364/489; 364/488; 364/490; 371/22.1; 395/750
[58] Field of Search ..................................... 395/500, 800, 395/650, 750, 182.12; 364/488, 489, 490, 491, 578, 580, 495, 468.04, 492; 326/121, 17, 98, 110, 18; 327/172, 149, 153, 245, 251, 284, 297, 469, 476; 371/27, 22.1, 22.3, 22.6, 22.4

[56] References Cited

U.S. PATENT DOCUMENTS

| | | | |
|---|---|---|---|
| 5,452,215 | 9/1995 | Washabaugh | 364/490 |
| 5,473,548 | 12/1995 | Omori et al. | 364/488 |
| 5,481,748 | 1/1996 | Cunto et al. | 395/375 |
| 5,487,017 | 1/1996 | Prasad et al. | 364/490 |
| 5,515,292 | 5/1996 | Roy et al. | 364/489 |
| 5,517,654 | 5/1996 | Kimbel et al. | 395/800 |
| 5,521,834 | 5/1996 | Crafts et al. | 364/489 |
| 5,550,760 | 8/1996 | Razdan et al. | 364/578 |

OTHER PUBLICATIONS

Najm, Farid N.: Transition density—A new measure of activity in digital circuits, IEEE, Feb. 1993.

Roy et al: Circuit activity based logic synthesis for low power reliable operations, IEEE, Dec. 1993.

Panda et al: Technology decomposition for low–power synthesis, IEEE, Feb. 1995.

Najm, Farid N.: Improved estimation of the switching activity for reliability prediction in VLSI circuits, IEEE, Feb. 1994.

Ghosh et al: Estimation of average switching activity in combination and sequential circuits, IEEE, Jan. 1992.

Olson et al: State assignment for low–power FSM synthesis using genetic local search, IEEE, Feb. 1994.

Farid N. Najm, "Transition Density, A Stochastic Measure of Activity in Digital Circuits", *28th ACM/IEEE Design Automation Conference*, Jul. 1991 ACM 0–89791–395–7/91/0006/0644, Paper 38.1 pp. 644–649.

*Primary Examiner*—Jacques H. Louis-Jacques
*Attorney, Agent, or Firm*—Warren L. Franz; Wade James Brady, III; Richard L. Donaldson

[57] ABSTRACT

To measure activity in a digital circuit, support sets for each node within the digital circuit are identified. The support set for a node includes primary input signals in a cone of influence of the node. The support sets are used to identify minimally infeasible nodes, those nodes having a greater number of inputs than the maximum number allowed. Partitions are established around minimally infeasible nodes, effectively converting the minimally infeasible nodes into feasible partitioned nodes. A transition density is determined for each feasible node and feasible partitioned node wherein the transition density is an average switching rate for each feasible node and feasible partitioned node. An average power dissipation can be determined for each node in response to the transition densities.

1 Claim, 3 Drawing Sheets

S(y1) = (x1, x2, x3), S(y2) = (x4, x5, x6)
S(y3) = (x5, x6, x7)
S(y) = (x1, x2, x3, x4, x5, x6, x7)

S(y1) = (x1, x2, x3)
S(y) = (y1, x4, x5, x6, x7)

METHOD OF MEASURING ACTIVITY IN A DIGITAL CIRCUIT

TECHNICAL FIELD OF THE INVENTION

The present invention relates in general to circuit analysis and simulation and more particularly to a method of measuring activity in a digital circuit.

BACKGROUND OF THE INVENTION

With the emergence of battery-operated applications that demand intensive computation in portable environment, power analysis and optimization has become one of the most important tasks to be solved by computer-aided design tools. With the advent of portable and hand-held electronics, it has become a requirement that integrated circuits have limited power dissipation. An accurate simulation of power dissipation has become highly desirable.

Power dissipation in integrated circuits is closely related to the choice of technology, circuit design, logic design, and the choice of architecture. One of the major reasons for the complementary metal oxide semiconductory (CMOS) technology to become a major force in current Very Large Scale Integration (VLSI) technology is that the power dissipation in CMOS circuits is significantly lower than in other technology circuits at comparable speeds. However, with the tremendous increase in number of devices in VLSI and ever-increasing number of portable applications requiring low power and high throughput, it has become increasingly more important to reduce the power dissipation.

Power dissipation in a CMOS circuit is directly related to the extent of switching activity of the internal nodes in the circuit. Estimating the level of activity has traditionally been very hard because it depends on the specific signals being applied to the circuit inputs. These signals are generally unknown during the design phase because they depend on the system in which the chip will eventually be used. Furthermore, it is practically impossible to simulate the circuit for all possible state transitions.

A direct and simple approach of estimating power is to simulate the circuit. Several circuit simulation based techniques have appeared in the literature. Given the speed of circuit simulation, these techniques cannot afford to simulate large circuits for long-enough input vector sequences to get meaningful power estimates. These approaches are strongly pattern dependent because they require a user to specify complete information about input patterns.

Recently, other approaches have been proposed that require the user to specify typical behavior at the circuit inputs using probabilities. These may be called weakly pattern dependent. With little effort, these techniques allow the user to cover a large set of possible input patterns. However in order to achieve good accuracy, one must model the correlations between internal node values, which can be very expensive.

A Monte Carlo simulation based technique is an example of a pattern dependent approach. The circuit is simulated for a large number of input vectors, while gathering statistics on the average power. This is based on the approximation that the average power is distributed normally over a finite time. This is shown, experimentally, for the ISCAS85 benchmark circuits using multiple evaluations, each covering 50 transitions per primary inputs. In this regard, his technique can also be termed pattern dependent. For the ISCAS85 circuits, the value of n ranges from 32 to 233. In this scenario, the validity of any such assumption, based on short simulation cycles, cannot be guaranteed. Also, the length of setup time used for the Monte Carlo simulation, which depends on the normality assumption, is debatable.

A transition density concept has been proposed with promising results. An excellent feature of this concept is that it allows measurements to be carried out in a pattern independent way. If some knowledge about the behavior of the input patterns is known then it can be taken into account by appropriate modification of the input probability values. An efficient algorithm to compute the density at every circuit node has been proposed in a paper by Farid N. Najm entitled "Transition Density, A Stochastic Measure of Activity in Digital Circuits", 28th ACM/IEEE Design Automation Conference (1991), paper 38.1. However, the efficiency of this algorithm is achieved at the cost of accuracy in the density values. This leaves much to be desired for its use in applications which require more accurate density values at each node in the circuit, e.g., circuit optimization problems with low power goal.

SUMMARY OF THE INVENTION

In accordance with the present invention, a method of measuring activity in a digital circuit is provided that substantially eliminates or reduces disadvantages and problems associated with conventional circuit optimization and simulation techniques.

According to an embodiment of the present invention, there is provided a method of measuring activity in a digital circuit that includes identifying a support set for each node within the digital circuit. The support set of a node includes primary input signals in a cone of influence of the node. In response to the support sets, nodes which are minimally infeasible are identified. Partitions are established around the minimally infeasible nodes, effectively converting the minimally infeasible nodes into feasible nodes. A transition density is determined for each feasible node and partition, the transition density defining an average switching rate determined at each feasible node and partition. In response to the transition densities, an average power dissipation at each node in the digital circuit is determined.

The present invention provides various technical advantages over existing circuit activity measurement techniques. For example, one technical advantage is in improving the efficiency and accuracy of parameter values for each node in a digital circuit. Another technical advantage is in partitioning certain nodes to increase the efficiency and accuracy of the activity measurement. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
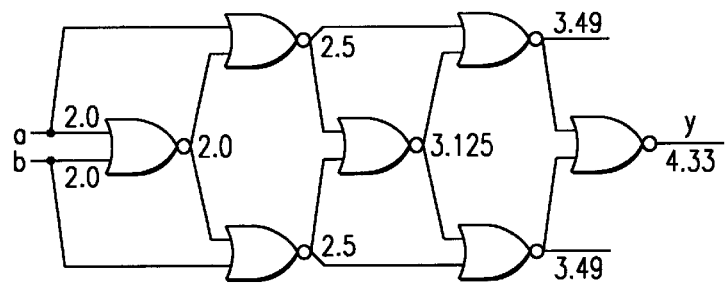
FIG. 1 illustrates an example of overestimation in a digital circuit.

The complexity of the problem lies in computing the Boolean difference probabilities at each node of the circuit. Larger circuit partitions, where each node within a partition is solved accurately with respect to that partition, result in more accurate activity measurements. An efficient circuit partitioning algorithm, with the goal of maximizing the number correlated nodes within each partition, will be described herein. This allows more accurate measurements compared to a randomly selected set of partitions. These methods are incorporated in an improved simulator for circuit activity measurement. Some results obtained on the ISCAS85 benchmark circuits are included.

Transition Density Simulation

A novel measure of activity in digital circuits is called the transition density. Transition density may be defined as the average switching rate at a circuit node. To briefly review the transition density concept, consider the average power drawn by a CMOS gate. Let D be the transition density at the gate output, i.e., the average number of transitions per second. If the gate has output capacitance C to the ground, then the average power dissipated is given by:

$$P_{average} = 0.5 C V_{dd}^2 D \quad (1)$$

where $V_{dd}$ is the power supply voltage. This is obtained as follows: If x(t) in the time interval (-T2,+T2], then the average power is:

$$P_{average} = \lim_{T \to \infty} \frac{C V_{dd}^2 n_x(T)}{2T} \quad (2)$$

$$P_{average} = 0.5 C V_{dd}^2 \left( \lim_{T \to \infty} \frac{n_x(T)}{T} \right) \quad (3)$$

where the transition density is defined as:

$$D(x) \underline{\Delta} \lim_{T \to \infty} \frac{n_x(T)}{T} \quad (4)$$

It is possible to simulate the circuit for a large number of input transitions and find an approximate value for D(x). It is impossible to determine a priori how long the simulation should be carried to get a reasonably good value as the number of possible input transitions grow exponentially with number of inputs. However, it can be shown that if the transition density at the circuit primary inputs are given then they can be propagated into the circuit to give the transition density at every internal and output node.

The density propagation procedure works as follows: Let P(x) denote the equilibrium probability of a log signal x(t), defined as:

$$P(x) \underline{\Delta} \lim_{T \to \infty} \int_{-\frac{T}{2}}^{+\frac{T}{2}} x(t) dt \quad (5)$$

This gives the fraction of a time a signal is high. It can be that if $y=f(x_1, x_2, \ldots, x_n)$ is a Boolean function and the inputs $x_i$'s are independent, the density of output y is give by the following expression:

$$D(y) = \sum_{i=1}^{n} P\left( \frac{\partial y}{\partial x} \right) D(x_i) \quad (6)$$

where $\partial y / \partial x$ is the Boolean difference of y with respect to x and is defined as:

$$\frac{\partial y}{\partial x} \underline{\Delta} y_{x=1} \oplus y_{x=0} \quad (7)$$

where $\oplus$ is the logical exclusive-or operation. Given the probability and density values at the primary inputs of a logic circuit, a single pass over the circuit, using equation (6), gives the density values at every node.

As an example, consider the simple case of an OR gate: $y = x_1 + x_2$.

$$*b89W♥ç \qquad \frac{\partial y}{\partial x} \underline{\Delta} y_{x=1} \oplus y_{x=0} \quad (8)$$

where $\oplus$ is the logical exclusive-or operation. Given the probability and density values at the primary inputs of a logic circuit, a single pass over the circuit, using equation (6), gives the density values at every node.

As an example, consider the simple case of an OR gate: $y = x_1 + x_2$.

$$\frac{\partial y}{\partial x_i} = x_2 \oplus 1 = \overline{x_2} \quad (9)$$

$$\frac{\partial y}{\partial x_2} = x_1 \oplus 1 = \overline{x_1} \quad (10)$$

$$D(y) = P(\overline{x_2}) D(x_1) + P(\overline{x_1}) D(x_2) \quad (11)$$

$$D(y) = D(x_1) + D(x_2) - P(x_1) D(x_2) - P(x_1) D(x_2) \quad (12)$$

In more complex Boolean functions, Binary Decision Diagrams can be used as an efficient tool to carry out the probability computation.

Inaccuracies in Density Simulation

A transition density algorithm may use the lowest level partitioning of a circuit to propagate the transition density values. Each gate in the circuit forms a partition. Due to the correlation amongst various signals in a circuit, a result of reconvergent fanout structures in the circuit, such a method can either underestimate or overestimate the density value at a node. This can be illustrated using two simple examples:

FIG. 1 shows an interconnection of NOR gates illustrating a case of overestimation. The primary inputs are assigned a transition density value of 2.0 and a switching probability of 0.5. The density value at node y, computed using the lowest level partitions, is 4.33.

Equation (6) suggests an upper bound on the value of transition density at any node, given by:

$$D_{max}(y) \leq \sum_{i=1}^{n} D(s_i) \quad (13)$$

Thus, the theoretical limit on the density value at node y is 2.0. Even if the algorithm ensures that $D(y) \leq D_{max}(y)$, the transition density value at node y is overestimated by 100%.

Figure 2:
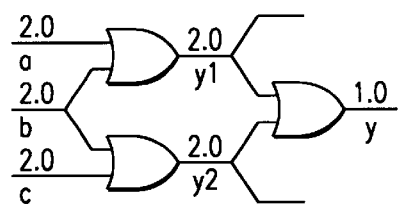
FIG. 2 illustrates an example of underestimation in a digital circuit.

FIG. 2 shows a situation where the density value is underestimated at node y. The computed density value is 1.0 and the correct value is 1.5. In this case, the density value at node y has been underestimated by approximately 33%.

These circuit structures are common and appear in most real designs. The errors in estimation can get worse with increasing depth of a circuit. If the goal of computation is to estimate the average value, then the errors due to overestimation and underestimation may cancel each other and the average value may appear reasonably accurate. However, this poses a severe problem in using such a tool in solving certain circuit optimization problems where a reasonably accurate estimation of activity is desired at each node. An example of fanout manipulation, to reduce the power dissipation of a circuit under a delay constraint, explains this point clearly:

Role of Accuracy in Circuit Optimization Applications

Figure 3A:
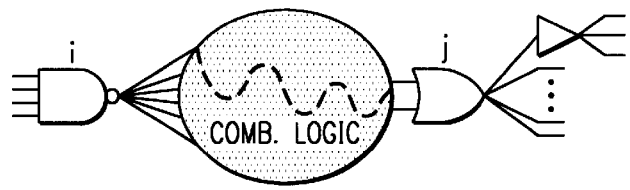
FIGS. 3a and 3b illustrate examples of both overestimation and underestimation in a digital circuit.
Figure 3B:
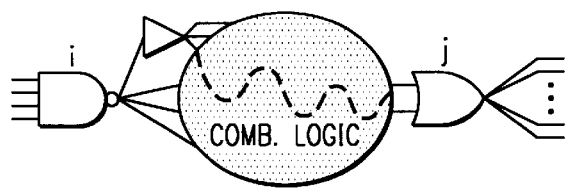

The average power dissipation of a circuit is given by:

$$P_{average} = \frac{1}{2} V_{dd}^2 \sum_{i=1}^{n} C_i D_i \qquad (14)$$

where $C_i$ is the capacitance and $D_i$ is the transition density at node i in a given circuit. In this discussion, we assume that the capacitance at a node has a linear dependence on the fanout of the node. FIG. 3 shows a general combinational network with two fanout nodes, i and j, such that the density estimation algorithm overestimates the density value at node i and underestimates the value at node j. Let the fanout at the two nodes be $f_i$.

Let the estimated transition densities be given by:

$$D_i(\text{est})=D+\delta D, \; D_j(\text{est})=D-\delta D \qquad (15)$$

Let the true value of densities be given by:

$$D_i(\text{act})=D-\delta D, \; D_j(\text{act})=D+\delta D \qquad (16)$$

Node i is overestimated and node j is underestimated, each by $2\delta D$. The total power dissipation of the circuit is given by:

$$P_{total}(\text{est})=P_{total}(\text{act})=P_{rest}+2Df_i \qquad (17)$$

where $P_{rest}$ is the power dissipation of the rest of the circuit. It should be noted here that the total and the average power dissipation of the circuit remains unaffected despite the error.

Let us assume that node i and node j appear on the critical path of this circuit. Consider an algorithm, optimizing power under delay constraint, that decides to move the buffer from node j to node i. This increases the fanout of node i and increases the fanout of node j. Let the change in fanout at both the nodes be $\delta f_i$. The delay is assumed to remain the same. The power dissipation estimate for the new circuit is given by:

$$P_{total}(\text{est})=D+\delta D)(f_i-\delta f_i)+D-\delta D)(f_i+\delta f_i)+P_{rest} \qquad (18)$$

It is assumed that the same buffer has been moved to the new position, and there is no change in the power dissipation due to this exchange. The estimated power shows a decrease of $2\delta D\delta f$.

$$P_{total}(\text{est})=2Df_i-2\delta D\delta f+P_{rest} \qquad (19)$$

However, consider the change in the actual power of the circuit:

$$P_{total}(\text{act})=(D-\delta D)(f_i-\delta f_i)+(D+\delta D)(f_i+\delta f_i)+P_{rest} \qquad (20)$$

$$P_{total}(\text{act})=2DF_i+2\delta D\delta f+P_{rest} \qquad (21)$$

The transformation which was supposed to decrease the power dissipation of the circuit by an amount $2\delta D\delta f$, ended up increasing the power dissipation by the same amount. The error is proportional to the change in fanout. A power optimization tool, working with such inaccuracies, can increase the power dissipation of the circuit rather than decrease it. This simple example suggests a need for more accurate computation.

A simple approach to improve the accuracy is to consider larger circuit partitions when computing the density values. However, the computation of Boolean difference probabilities becomes a major problem for the performance of the algorithm. In the next section, an efficient method for the computation of difference probabilities is presented.

Computing Boolean Difference Probabilities

A simple method to compute the Boolean difference probabilities is based on Equation 7. Since previous transition density algorithms consider only the lowest level partitions, only small OBDDs need to be created and the efficiency in computing the difference probabilities is not a concern.

However, when we deal with larger functions, this approach becomes rather inefficient. At every node in a given circuit, one must compute the OBBD of the node, use two RESTRICTION operations for each $x_i$ to compute $y_{x_i}=0$ and an APPLY operation for each $x_i$ to compute $y_{x_i}=0 \oplus y_{x_i}=0$. If there are V nodes in the OBDD and i depends on n variables, then the total work done at a node is $O(V+n2V+nV^2)$. For a circuit with L nodes, this method has an $O(nLV^2)$ complexity. It should be noted here that the number of nodes in an OBDD can grow exponentially with respect to n. This may be viewed as a top-down method because first the OBBD at a node must be created and then the OBDD can be used to compute the difference probabilities.

There is an inherent problem with this top-down approach of computing the difference probabilities. It does not make use of the work already done to compute the difference probabilities of the child nodes of a node being considered. The OBDDs required to compute the difference probabilities can be computed in a bottom-up fashion, just like the APPLY operation creates the OBDDs using a bottom-up methodology. It improves the efficiency of computation in producing maximally reduced OBDDs on a need to compute basis. A new operation over OBDDs, called the DIFFERENCE operation, has been defined.

The DIFFERENCE Operation

The DIFFERENCE operation generates Boolean difference functions by applying algebraic operations to other functions. Given argument functions F(x) and G(x), their Boolean difference with respect to x, and the binary Boolean operator <op>, (e.g., AND or OR), it returns the function $$\frac{\delta(F(x)<op>G(x))}{\delta x}.$$

The DIFFERENCE operation is used to construct an OBDD representation of Boolean difference of each gate output, with respect to a variable it depends on, according to the gate operation and using the OBDDs created for its inputs. Each DIFFERENCE operation can be implemented as a sequence of APPLY operations.

The following properties of the Boolean difference operation are used to enable the bottom-up computation:

$$X=(x_1, x_2, \ldots, x_i, \ldots, x_n)$$

$$\frac{\overline{\partial F(X)}}{\partial} x_i = \frac{\partial F(X)}{\partial x_i} \qquad (23)$$

$$\frac{\partial(F(X)G(X))}{\partial x_i} = F(X)\frac{\partial G(X)}{\partial x_i} \oplus G(X)\frac{\partial F(X)}{\partial x_i} \oplus \frac{\partial F(X)}{\partial x_i}\frac{\partial G(X)}{\partial x_i} \qquad (24)$$

$$\frac{\partial(F(X)+G(X))}{\partial x_i} = \qquad (25)$$

$$\overline{F(X)}\frac{\partial G(X)}{\partial x_i} \oplus G(X)\frac{\partial F(X)}{\partial x_i} \oplus \frac{\partial F(X)}{\partial x_i}\frac{\partial G(X)}{\partial x_i}$$

$$\frac{\partial (F(X) \oplus G(X))}{\partial x_i} = \frac{\partial F(X)}{\partial x_i} \oplus \frac{\partial G(X)}{\partial x_i} \quad (26)$$

Equations 23–26 define the difference function for the output NOT, AND, OR, and XOR gates, respectively. The equations for NAND, NOR, and any complex gate can be defined in a similar fashion.

These equations point out some extremely useful properties of the DIFFERENCE operation, and can be used to enable more efficient computation. These equations allow the required OBDDs to be constructed in a bottom-up manner. This implies that the OBDD for a node in the circuit can be created using the maximally reduced OBDDs which have already been computed. Also only the minimum number of required OBDDs need to be created. For example, OBDDs for the nodes which only feed to inverters and XOR gates need not be created at all. The output node of an inverter requires no computation at all if the input node has already been computed. Also, the OBDDs for the primary outputs of a circuit need not be created at all.

Each DIFFERENCE operation can be represented as a sequence of APPLY operations. For example, Equation 26 can be interpreted as follows:

DIFFERENCE$((F(X)<XOR>G(X)), x_i) =$ (27)

$$\text{APPLY}\left(\frac{\partial F(X)}{\partial x_i} <XOR> \frac{\partial G(X)}{\partial x_i}\right)$$

Figure 4:
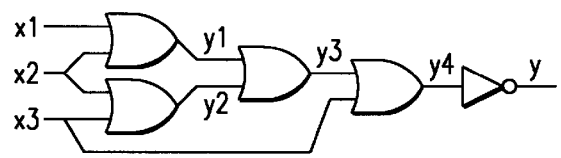
FIG. 4 illustrates an example of the efficiency of a difference operation for a digital circuit.
Figure 5:
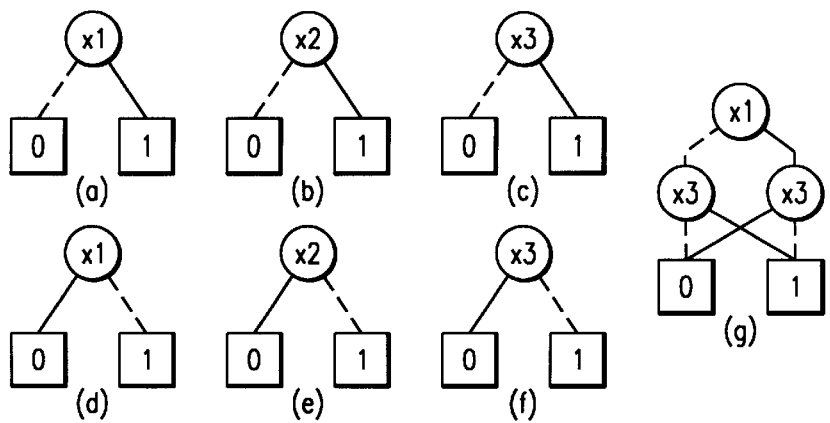
FIG. 5 illustrates the input node diagrams for the digital circuit of FIG. 4.

FIG. 4 shows an example illustrating the efficiency of the DIFFERENCE operation. For the circuit shown in FIG. 4, all the OBDDs needed to compute the density values using the DIFFERENCE operation are shown in FIG. 5. However, if the simple method, using Equation 7, is used then the OBDDs for all the intermediate and output nodes must be created. On these OBDDs, a total of 26 RESTRICTION and 13 APPLY operations will be required to compute all the difference probabilities. The OBDDs involved in computation are larger as well.

The efficiency of the DIFFERENCE operation allows larger partitions to be used in computing the difference probabilities. This brings us to the problem of partitioning a circuit to make the density computation more accurate. If partitions are formed so that each partition packs more correlated nodes, then the accuracy of computation will be better than a randomly chosen set of partitions. The next section describes such a circuit partitioning algorithm.

Circuit Partitioning

Some of the terms used in the description of the algorithm are defined first.

Definitions

A combinational circuit is modeled as a directed acyclic graph. Every edge in this graph is an ordered pair of distinct vertices. A directed edge [v, w] leaves v and enters w. If v is a vertex in the graph then its in-degree is the number of edges [u, v] and its out-degree is the number of edges [v, w]. Nodes of in-degree 0 are the primary inputs to the circuit and nodes of out-degree 0 are the primary outputs of the circuit. We refer to the sets out$(v)=\{[v,w]\epsilon E\}$ and in$(v)=\{[u,v]\epsilon E\}$, for each v$\epsilon$V, as out-adjacency list and in-adjacency list of a vertex, respectively.

The support of a function f, denoted as S(f), is the set of variables f explicitly depended upon. $|S(f)|$ is the cardinality of S(f).

The function f is a feasible function if $|S(f)|\leq k$, where k is the maximum allowed number of inputs in a partition. The function f is an infeasible function if $|S(f)|>k$.

A node v in a Boolean network $\eta$ is minimally infeasible if $|S(f)|>k$ and for every node w such that there exists an edge [w,v], $|S(w)|$ is less than or equal to k.

Partitioning Algorithm

The partitioning strategy is of extreme importance here. The accuracy increases as the size of the partition grows, however, the algorithm will slow down as larger OBDDs will be created. Also, the memory usage increases with the increasing size of partitions. For large circuits, if care is not taken to keep the size of the partitions small enough, rapid growth in the size of the OBDDs can make the computation run into memory overflow problems. The strategy for partitioning should be such that the partitions are kept small while maximizing the number of correlated nodes within each partition.

How should we determine the size of a partition? We know that the number of inputs is the most important factor in determining the size of an OBDD. This is because the size of an OBDD can grow exponentially with the respect to the number of inputs. Also, if number of inputs is small, the size of the OBDD will remain manageable even if there are large number of gates in a partition. For this reason, the number of inputs has been chose as the parameter to determine the partition size. The circuit is partitioned in such a way that each partition has a single output which depends on at most k variables. These variables are either the primary inputs or the outputs of the various partitions created by the algorithm. The partitioning algorithm works as follows:

First, the support set of every signal in the network is computed. At this stage, the support set of a signal consists of all the primary input signals in its cone of influence. The computation of support sets can be accomplished using the breadth-first search technique. The breadth-first search starts at every primary input node in turn, and adds that primary input to the support set of every node that can be reached during the search.

The procedure compute_support in Table 1 contains the implementation details. If there are E edges, V vertices, and n of these vertices are primary inputs then the complexity of this algorithm will be O(nE). For a circuit with bounded fan-in, this equivalent to O(nV). For circuits with n much smaller than V, this can be regarded as a linear algorithm with respect to the number of nodes in the circuit.

TABLE 1

Algorithm for computing support sets of each node in a circuit

```
procedure compute_support (dag G, list I);
    for each vertex v in I /* I is the set of
                                primary inputs */
        queue := {V}
        do until queue is empty
            w := queue(1); queue := queue[2 ... ];
            add v to w's support list S(w);
            mark w visited;
            for each u in out-adjacency list of w
                if (u is not visited and
                    u is not a member of queue)
                    then queue :- queue & {u};
end find_support;
```

These support sets are then used to find the set of minimally infeasible nodes in the digraph. This simply requires a single pass over the list of vertices while examining the size of the support sets of their immediate children. Table 2 contains pseudo code for implementing the function called min_inf_nodes. As some of the children nodes of the minimally infeasible nodes get selected to form partitions, a new set of minimally infeasible nodes gets created. This process continues until all the nodes in the circuit are made feasible.

TABLE 2

Algorithm for finding the set ot minimally infeasible nodes in the graph

```
list function min_inf_nodes (dag G, list V, int k);
    M := { };
    for each vertex v in V
        if (|S(v)| > k and for each u in in-adjacency
        list of v
            either (|S(v)| = k) or (|S(u)| < k))
            then M := M & {v};
    Return(M);
end min_inf_nodes;
```

Once the set of minimally infeasible nodes is found, the next step makes these nodes feasible. This is accomplished by creating a partition on one or both of the children of the node under consideration. At this point, a heuristic is used to decide which child should be partitioned first. This heuristic computes the cost of creating a partition and the node with the minimum cost is chosen first.

The cost of creating a partition is computed as follows. For each node in the in-adjacency list of the minimally infeasible node, the intersection of its support set with the support sets of all other nodes in the list is determined. The cost is the sum of the cardinality of the sets obtained as a result of various intersections. The cost of partitioning the child node $v_i$ is given by:

$$C(v_i) = \sum_{j=1, j \neq i}^{n} |S(v_i) \cap S(v_j)| \qquad (28)$$

Figure 6A:
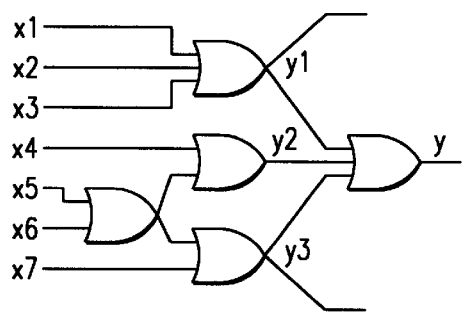
FIGS. 6a and 6b illustrate examples of cost computation for a digital circuit.
Figure 6B:
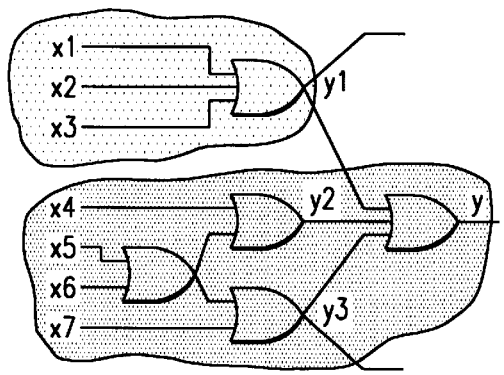
Figure 7:
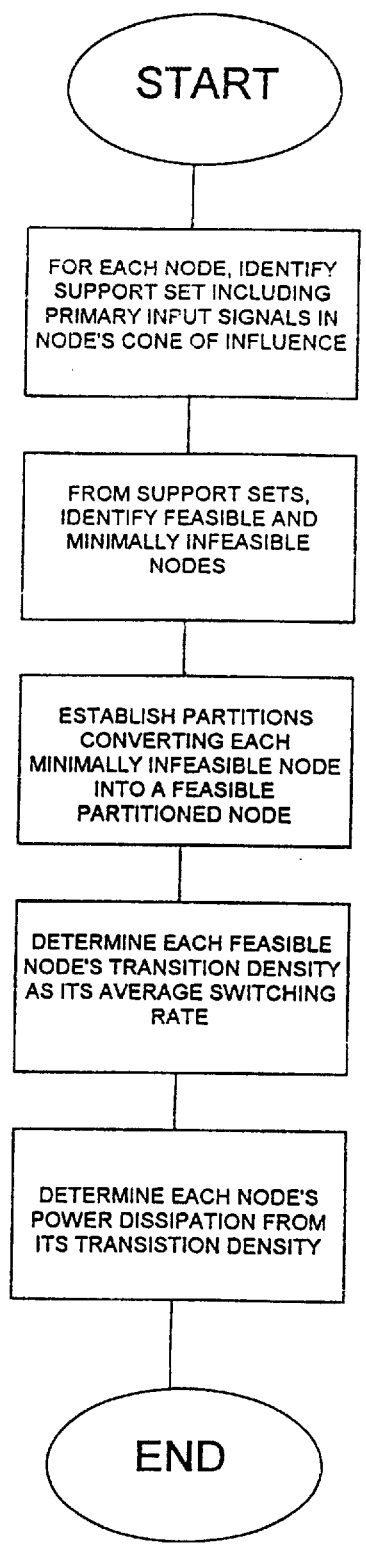
FIG. 7 is a flow chart illustrating my method of measuring power dissipation in a digital circuit of elements connected between a set of nodes.

An example of cost computation is shown in FIG. 6. Let the partition size be 5, $k=5$. Node y is a minimally infeasible node. This node can be made feasible by creating a partition at either of its three child nodes (y1, y2, y3). The cost of creating partitions for the three nodes are 0, 2, and 2 respectively. Node y1 having the minimum cost is chosen to form a partition. In this example, the transition density values of all the nodes shown in the figure will remain accurate despite partitioning. Such will not be the case if either node y2 or node y3 is chosen to form the partition.

Once a partition is created, the support sets of some of the nodes in the graph are updated. A breadth-first search based technique is used to accomplish this. Only some of the nodes reachable from the partitioned node go through the update process. Since the next iteration of computation needs only the minimally infeasible nodes created as a result of some of the partitions formed in the current iteration, the update stops at a node if it becomes an infeasible node. The updating process also stops at a node if it has already been partitioned before. This is because the current partition has no effect on the support sets of reachable nodes having a path through the partitioned node. Table 3 contains the implementation details of the support updating process. In the worst case, updating support sets may require $O(kf_o)$ work.

TABLE 3

Algorithm for updating support sets after creating a partition

```
procedure update_support (vertex v, dag G, int k);
    S(v) := {v}; queue := {v};
    do until queue is empty
```

TABLE 3-continued

Algorithm for updating support sets after creating a partition

```
        w := queue(1); queue := queue [2 . . . ];
        mark w visited;
        for each vertex w in out-adjacency-list of v
            if (w is not visited and
                w is not a member of queue)
                then for each u in in-adjacency-list of w
                    do S(w) := S(w) union S(u);
                    if (u is not a member of PARTITIONS and
                        S(u) is less than or equal to k)
                        then queue := queue & [u]
end update_support;
```

The circuit partitioning procedure stops when there are no minimally infeasible nodes left in the graph. The circuit is now divided into partitions such that each partition depends on at most k variables. The overall complexity of the partitioning algorithm is $O(kf_oV)$ which can be regarded as linear for founded fanout circuits.

Overall Algorithm Outline

The partitioning algorithm works in stages. At each stage, the set of currently minimally infeasible nodes result in a set of partitions. These sets of partitions are stored in the order of their formation:

$$S_P = (S_{P_0}, S_{P_1}, \ldots, S_{P_{r-1}}) \qquad (29)$$

where $S_{P_0}$ is the set of primary input nodes and $S_{P_{m-1}}$ is the set of primary output nodes. The computation of transition density values can proceed in the order of the elements in this set. This is because the nodes in the partition set $S_{P_j}$ do not require the density values for any of the nodes in the partition sets $S_{P_{j+1}}, \ldots, S_{P_{m-1}}$. Within each set $S_{P_j}$, the partitions can be computed in an arbitrary order. Within each partition, the computation of density values is carried out in a bottom-up fashion.

Since each partition within a partition set ready for computation can be considered in an arbitrary order, this suggests an easy adaptation of the algorithm to parallel methods. This is further aided by the fact that each partition depends on approximately k variables. The amount of work needed to compute the transition densities tends to be comparable f or each partition. This will allow a uniform distribution of load on each processor.

Experimental Results

The circuit partitioning-based method described in this paper has been implemented in a program called Circuit Activity-Meter (CAM). The program is implemented in Common LISP and has been run on a large number of combinational logic examples. The primary motivation for implementing this tool came from the requirement of having more accurate density measurements for solving certain circuit optimization problems with low power goal. A technology mapping system, for optimizing power dissipation in combinational circuits, has been implemented using CAM.

A key feature of CAM is its ability to do the trade-off between speed and accuracy. The user can specify the partition size according to the needed level of accuracy in the computation. However, several experiments with large number of benchmark examples and real designs indicate that reasonably small partitions (each partition having five to six inputs) significantly improves the accuracy of density values compared to the results obtained using the lowest level partition.

The efficiency of DIFFERENCE operation-based computation of Boolean difference probabilities allows fewer and smaller OBDDs to be created. Over a set of 50 small combinational examples, with the number of primary inputs of up to 20, this method requires 40% fewer nodes than the straightforward method of computing Boolean difference probabilities. These gains, in general, are larger for larger examples. It also speeds up the computation. For some of these examples, speedups of up to five times can be observed. All these examples were chosen so that complete OBDDs could be created. These gains are for the case when all the nodes in the circuits were computed accurately. The same variable orderings were considered in the two cases. These orderings were chosen randomly.

It becomes exceedingly difficult to asses the accuracy for large circuits because the OBDDs become unacceptably large. The choice of variable ordering is of extreme importance here. The OBDD tool used here did not have a facility for ordering variables. However, the basic idea behind the circuit partitioning approach is to keep the number of inputs in each partition small enough and achieve reasonably accurate results which can be used in solving circuit optimization problems with low power goal and in estimating the average power dissipation of the circuit.

ISCAS85 benchmark combinational circuits have been used for experimentation. Table 4 shows the lower bound on percentage of nodes having 100% accurate value as a result of choosing a partition of a given size. The size of the partition is given in terms of maximum number of input variables for a partition. The 100% accuracy refers to the fact that these nodes will have the same density value even if an exhaustive simulation was carried out. The second column contains the size (number of inputs) of the largest gate in these circuits. This is needed to guarantee that the partitions contain at least these many input variables. The gates cannot be broken up into smaller ones as it will change the power dissipation of the circuit. The third column gives the lower bound when the lowest level partitioning is used. Columns 4 through 7 give the lower bounds for increasing circuit partition sizes.

TABLE 4

LOWER BOUND ON % NODES WITH 100% ACCURACY

| | | | | Partition Size | | | | |
|---|---|---|---|---|---|---|---|---|
| ckt | k | llp | k | k + 1 | k + 2 | k + 3 | k + 4 | k + 5 | k + 10 |
| c432 | 9 | 11.25 | 28.12 | 28.12 | 28.12 | 28.12 | 28.12 | 28.12 | 58.74 |
| c499 | 5 | 19.80 | 27.72 | 27.72 | 27.72 | 31.68 | 31.68 | 35.64 | 59.40 |
| c880 | 4 | 14.10 | 28.45 | 32.63 | 34.20 | 39.16 | 41.51 | 42.55 | 51.95 |
| c1355 | 5 | 7.32 | 36.63 | 36.63 | 36.63 | 42.49 | 42.49 | 48.35 | 61.53 |
| c1908 | 8 | 24.54 | 62.72 | 65.34 | 66.93 | 69.09 | 70.68 | 72.84 | 79.43 |
| c2670 | 5 | 13.24 | 30.34 | 42.41 | 45.93 | 49.79 | 55.49 | 61.11 | 74.76 |
| c3540 | 8 | 9.04 | 54.76 | 56.80 | 57.15 | 58.84 | 59.79 | 60.75 | 64.95 |
| c5315 | 9 | 15.50 | 70.95 | 75.03 | 78.11 | 79.58 | 82.61 | 85.00 | 88.94 |
| c6288 | 2 | 10.59 | 13.08 | 13.08 | 16.34 | 19.03 | 22.47 | 25.37 | 43.09 |
| c7552 | 5 | 8.68 | 60.30 | 61.73 | 66.71 | 67.45 | 70.58 | 75.88 | 86.16 |

These numbers give the lower bound on percentage of nodes with accurate value. In reality, more nodes can have accurate values. This is due to the fact that not every node is affected by reconvergent fan-out. As more and more nodes are computed accurately, the percentage of nodes with smaller inaccuracies increases as well. The numbers in Table 4 indicate that much more accurate results can be obtained and computed to the lowest level partition by using fairly small partitions i.e, the partition size of k. This appears to be good in most cases, and is excellent in the case of c1908, c3540, c5315, and c7552. The improvements for c6288 and c499 are relatively poor. By using partitions such that each partition depends on less than 20 variables, true for the k+10 case, a fairly high percentage of nodes can be precisely estimated.

Experimentation with the technology mapping problem shows that a partition size of k was sufficient for making correct decisions and in selecting gates from a library to reduce the power dissipation in most cases. The algorithm using lowest level partitions made several mistakes during the technology mapping process. If the value of k is small then a larger value of partition size should be used.

Table 5 contains the value of average transition density for these circuits computed for various partition sizes. Column 1 contains the result of logic simulation using an average of 1000 transitions per input node. However, it must be remembered that these simulation results are pattern dependent. For a circuit with n primary inputs, the number of distinct state transitions where each state transition can have a different contribution to the power dissipation of the circuit is $2^{n-1}$ ($2^n-1$). The number of primary inputs for these circuits range from 32 (c6288) to 233 (c2670). It is quite likely that only a small fraction of the possible distinct state-transitions were utilized during the simulation process. Hence, a comparison should be made with this fact in mind. From the data Table 5, it is reasonable to believe that the values obtained using the partition size k+10, in most cases, is a more accurate representation of average transition density values for these circuits.

TABLE 5

AVERAGE TRANSITION DENSITY VALUES

| | | | | Partition Size | | | | |
|---|---|---|---|---|---|---|---|---|
| ckt | sim | llp | k | k + 1 | k + 2 | k + 3 | k + 4 | k + 5 | k + 10 |
| c432 | 3.39 | 3.46 | 3.19 | 3.19 | 3.19 | 3.19 | 3.19 | 3.19 | 3.00 |
| c499 | 8.57 | 11.36 | 11.36 | 11.36 | 11.36 | 11.36 | 11.36 | 11.36 | 11.36 |
| c880 | 3.25 | 2.78 | 3.48 | 3.39 | 3.45 | 3.43 | 3.40 | 3.40 | 3.39 |
| c1355 | 6.18 | 4.19 | 6.87 | 6.87 | 6.87 | 6.87 | 6.87 | 6.87 | 6.87 |
| c1908 | 5.01 | 2.97 | 4.38 | 4.58 | 4.64 | 4.74 | 4.78 | 4.90 | 5.16 |
| c2670 | 4.00 | 3.50 | 3.45 | 3.46 | 3.44 | 3.51 | 3.51 | 3.52 | 3.56 |
| c3540 | 4.49 | 4.47 | 4.62 | 4.69 | 4.68 | 4.77 | 4.58 | 4.62 | 4.83 |
| c5315 | 4.49 | 3.52 | 3.66 | 3.62 | 3.62 | 3.66 | 3.69 | 3.88 | 3.89 |
| c6288 | 34.2 | 25.10 | 23.34 | 21.32 | 22.19 | 21.87 | 22.02 | 21.84 | 20.88 |
| c7552 | 5.08 | 3.85 | 4.14 | 4.12 | 4.01 | 3.98 | 3.92 | 3.84 | 3.72 |

These results point out an interesting fact about the average transition density values using the lowest level partition. In some cases, like c7552, the average value obtained using the lowest level partition is closer to the value obtained using the k+10 size partition than the value obtained using an intermediate partition size. This can be explained as follows: At the lowest level partition, density values for a large number of nodes in the circuit are being either underestimated or overestimated Some of these errors may cancel each other when an average value is considered. Though the average value may look more accurate, there is no reason to believe that such is the case with values at the individual nodes in the circuit.

So far as the simulation values are concerned, c7552 points out a case where simulation seems to have overestimated the value. It appears likely because the circuit has a large number (207) of the primary inputs. The simulation, which was carried on for about an hour, is unlikely to capture even a small fraction of total number of distinct state transitions. The average density value for the partition size k+10 contains at least 86.16% nodes with accurate density values and can be safely assumed to be a closer approximation to reality.

Experiments show that the partitions with small number of inputs, k for most of the examples in ISCAS85 circuits, give a reasonably accurate estimate of densities at various nodes in the circuit. These results are accurate enough to be used in conjunction with circuit optimization problems.

Table 6 shows a comparison of the CPU times for these methods. The run-times, obtained on a SPARC station 10, are given in seconds. Column 2 contains the run-times for the lowest level partition and Column 3 contains the run-times when the partition size is k. The run-times increase as the size of the partition increases. However, the real problem with large partition comes from the memory usage. So far as the run-times are concerned, much larger OBDDs can be created very quickly.

TABLE 6

CPU TIME COMPARISONS

| ckt | c432 | c499 | c2880 | c1355 | c1908 | c2670 | c3540 | c5315 | c6288 | c7552 |
|-----|------|------|-------|-------|-------|-------|-------|-------|-------|-------|
| llp | 0.28 | 0.33 | 0.61  | 0.85  | 1.24  | 1.79  | 2.25  | 3.33  | 3.59  | 4.76  |
| k   | 21.1 | 12.6 | 9.7   | 13.8  | 15.6  | 21.6  | 44.9  | 56.7  | 9.9   | 26.7  |

The algorithm using lowest level partitioning runs much faster. However, the inaccuracies in the density values make it inapplicable in the circuit optimization problems. The algorithm using partitions with fairly small number of inputs is slow compared to this approach, but fast enough to be used efficiently for estimation within an optimization system, and provide much more accurate values.

Summary

To summarize, a new recursive approach for computing the Boolean difference probabilities using OBDDs has been described. An efficient circuit partitioning algorithm, with the goal of maximizing the number correlated nodes within each partition, has been developed. This allows more accurate measurements compared to a randomly selected set of partitions. The efficiency of this system can be further improved by using an efficient variable ordering algorithm for OBDDs. At present, this method is limited to combinational circuits only and does not consider glitches. The algorithms presented here have been incorporated in an improved simulator for circuit activity measurement. Some results obtained on the ISCAS85 benchmark circuits establish the feasibility and efficiency of the approach.

Thus, it is apparent that there has been provided a method of measuring circuit activity in a digital circuit that satisfies the advantages set forth above. Although the preferred embodiment has been described in detail, it should be understood that various changes, substitutions, and alterations can be made herein without departing from the spirit and scope of the present invention as defined by the following claims.

What is claimed is:

1. A method of measuring power dissipation in a digital circuit of elements connected between a set of nodes, comprising the steps of:

identifying, for each node a corresponding support set of the node including primary input signals in a cone of influence of the node;

identifying, in response to the support sets, nodes that are feasible and minimally infeasible;

establishing around each minimally infeasible node a corresponding partition converting the minimally infeasible node into a feasible partitioned node;

determining a transition density for each feasible node in response to said establishing step, the transition density being an average switching rate determined at each feasible node; and determining a power dissipation at each node in response to the transition density.

* * * * *